United States Patent [19]

Sugitani et al.

[11] Patent Number: 4,639,573
[45] Date of Patent: Jan. 27, 1987

[54] AUTOMATIC GROOVE TRACING CONTROL METHOD FOR ARC WELDING

[75] Inventors: Yuji Sugitani; Naohiro Tamaoki, both of Tsu, Japan

[73] Assignee: Nippon Kokan Kabushiki Kaisha, Tokyo, Japan

[21] Appl. No.: 750,169

[22] Filed: Jul. 1, 1985

[30] Foreign Application Priority Data

Jul. 4, 1984 [JP] Japan ................... 59-137245

[51] Int. Cl.$^4$ ................... B23K 9/12
[52] U.S. Cl. ................... 219/124.22; 219/125.12
[58] Field of Search ................... 219/124.34, 124.22, 219/125.12

[56] References Cited

U.S. PATENT DOCUMENTS 4,034,184 7/1977 Fernicola ................... 219/125.12
4,394,559 7/1983 Nomura et al. .

FOREIGN PATENT DOCUMENTS 573462 2/1979 Japan .

Primary Examiner—Clifford C. Shaw
Attorney, Agent, or Firm—Fleit, Jacobson, Cohn & Price

[57] ABSTRACT

A control method in which during arc welding a welding torch is moved in its axial direction so as to maintain the arc current or welding current at a predetermined value and thereby maintain the arc length constant and the torch is caused to weave in the width direction with respect to the direction of welding while changing the direction of the weaving each time the axial displacement or position of the torch attains a predetermined value. The weaving speed is decreased when the torch approaches each turning point of the weaving and the gain of the speed control for the torch axial movement is increased when the torch approaches each turning point in the course of its movement from the central area toward the turning point during each weaving cycle.

4 Claims, 3 Drawing Figures

AUTOMATIC GROOVE TRACING CONTROL METHOD FOR ARC WELDING

BACKGROUND OF THE INVENTION

1. Field of the Invention

The present invention relates to an arc welding method of the type in which the arc itself causes the movement of a torch to accurately follow the joint to be welded, and more particularly the invention relates to an automatic tracing control method for the arc welding torch.

2. Description of the Prior Art

To realize an unattended automatic welding, it is necessary to use a torch sensor and a torch position adjusting mechanism for automatically sensing and controlling the torch position with respect to the two-dimensional deviation of the groove line which varies from instant to instant during the welding operation.

Various sensors of the above type have been used in the past and they include the contact types, such as, the differential transformer, potentiometer and limit switch types and the non-contact types, such as, the electro-magnetic and optical position detecting types. However, since the use of these sensors requires that a sensor or specific device be positioned near the torch in any case, it is necessary to maintain a predetermined distance between the sensing position and the controlled system position due to the dimensional limitation and it has been possible to realize only such practical control systems which have a limited accuracy despite their complicated constractions and in which the torch position is controlled by providing the sensor output with a time differential corresponding to the dimension of the spacing.

Japanese Patent Publication No. SHO 57-3462 invented by H. Nomura and Y. Sugitani and assigned to the same assignee discloses a technique which overcomes the dificiencies of the above-mentioned prior art methods of the type using a sensor. More specifically, in a consumable electrode arc welding or non-consumable electrode arc welding in which the wire feed speed is maintained constant, a torch driving mechanism is provided to compensate the arc characteristics for variations in the wire extension or the arc length and the amount of movement of the torch is always monitored by the mechanism thereby utilizing the axial-direction displacement or position of the torch for tracing control purposes. This method makes it possible to effect the welding stably without the provision of a tracing sensor as a separate member. In other words, in this conventional arc welding method of the arc sensor type, the movement of the torch in its axial direction is controlled by the driving mechanism so that a predetermined arc voltage is maintained if the welding power source is a DC constant current source and a predetermined welding current is maintained if the welding power source is one having a DC constant voltage characteristic. Then, in combination with a torch driving operation which reciprocates the torch in the width direction of the groove of the base metal along the welding direction at a predetermined speed (hereinafter referred as a weaving speed) while moving the torch in the welding direction along the groove line at a predetermined speed (hereinafter referred to as a welding speed), the turning point of the weaving operation is set to each point where the displacement or position of the torch in its axial direction attains a predetermined value thus causing the torch to always weave within the width of the groove parallelly to the groove face and performing a tracing operation and also the height from the base metal surface at the joint to be welded to the terminal end of the weaving is always held constant thereby performing the arc welding. While, in this case, variation of the groove width with respect to the welding direction causes variation of the groove cross-sectional area for each half cycle of the weaving, in accordance with the conventional arc sensor-type arc welding method the axial displacement of the torch for each half cycle is integrated over the time and a signal corresponding to the cross-sectional area of metal deposition is generated for each cycle. Also, separately the change of the distance in the axial direction for each cycle is differentiated to generate a signal corresponding to the distance between the terminal ends of the weaving for each cycle. Thus, by using these signals obtained during the preceding cycle, the preset values of the welding conditions including the welding current, arc voltage, welding speed, etc., are corrected in accordance with the separating determined algorisms and in this way the desired metal deposition as well as the proper penetration bead in the case of the one-side welding are always ensured.

SUMMARY OF THE INVENTION

It is the primary object of the present invention to provide an improved method capable of more effectively performing the groove tracing control according to the conventional arc sensor-type arc welding method and particularly ensuring a high degree of tracing accuracy when applied to a groove having a small groove angle.

To accomplish the above object, the automatic tracing control method according to the invention is so designed that in the arc welding effected by moving the welding torch in its axial direction such that the arc voltage or the welding current is maintained at a predetermined value thereby maintaining the arc length constant and weaving the torch in the width direction of the groove with respect to the welding direction while changing the direction of the weaving each time the axial displacement or position of the torch attains a predetermined value, the control method performs a series of control operations comprising detecting the positions of the terminal ends for each weaving cycle from the weaving stroke of the torch in the groove width direction, establishing a predetermined small area on the center side from each of the terminal ends, simultaneously increasing the speed of the axial movement and decreasing the speed of the weavingdirection (width-direction) movement each time the weaving position of the torch in the groove-width direction enters each of the small areas from the groove center side, restoring the weaving-direction (widthdirection) speed of the torch to the initial value each time the direction of the weaving is changed and restoring the speed of the torch in the axial direction to the initial value each time the torch emerges from each of the small areas and enters the groove central area.

In accordance with the automatic tracing control method for arc welding according to the invention, by virtue of the fact that the axial travel speed and weaving speed of the torch are different between the groove central portion and the groove slope portions, there is the effect of improving the accuracy of groove tracing control and stabilizing the result of welding.

The above and other objects as well as advantageous features of the invention will become more clear from the following description taken in conjunction with the drawings.

DESCRIPTION OF THE PREFERRED EMBODIMENTS

In order to facilitate its understanding, the invention will now be described in greater detail with reference to its preferred embodiment related to the conventional technique and to the drawings.

Figure 1:
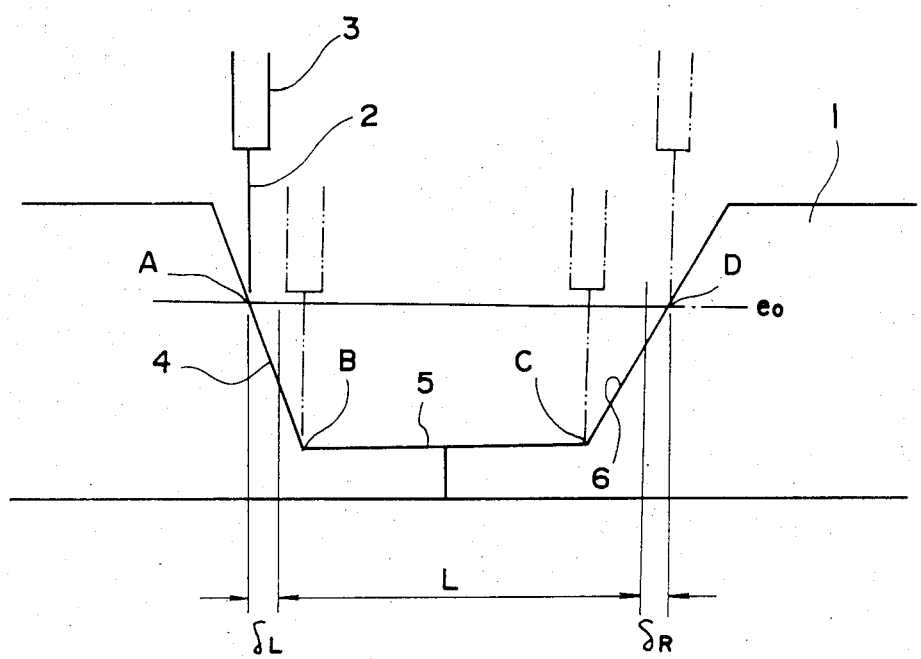
FIG. 1 is a diagram showing the relation between the shape of a groove and the position of a welding torch.

Referring to FIG. 1, numeral 1 designates a base metal, 2 a welding electrode positioned opposite to and inside the groove end faces of the base metal 1, and 3 a torch holding the electrode 2 such that a welding arc is produced between the electrode 2 and the base metal 1 by a constant current source.

Now, in FIG. 1 the torch 3 is moved to the right in the Figure so as to spread a weld metal from a point A toward a point C along one groove slope 4. In this case, in order to maintain the arc voltage constant at the value of the point A, the torch 3 is vertically moved in response to changes in the vertical distance from the groove face (4, 5, 6) to the electrode forward end so as to always control constant the distance between the electrode 2 held by the torch 3 and the groove face, that is, the arc length.

Figure 2:
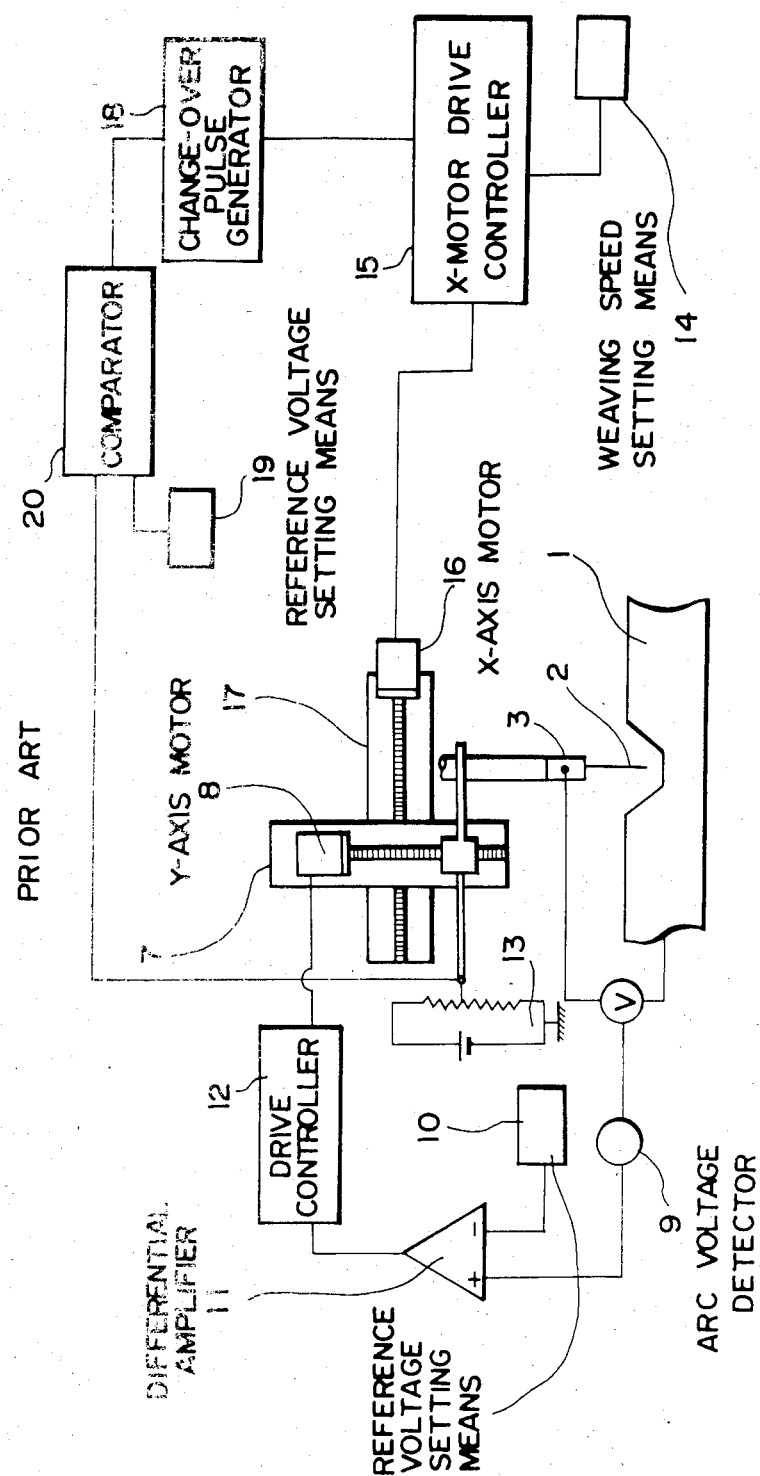
FIG. 2 is a block diagram of a control circuit used with a conventional control method.

FIG. 2 shows an example of the prior art control circuit for controlling the movement of the torch.

In the Figure, numeral 7 designates a vertical-direction (Y-axis) driving mechanism for vertically moving the torch 3, and 17 a width-direction (X-axis) driving mechanism for horizontally moving the torch 3. The driving mechanisms 7 and 17 are respectively operated by a Y-axis motor 8 and an X-axis motor 16. The vertical movement of the torch 3 is effected by obtaining the difference between a detection signal from an arc voltage detector 9 and a reference arc voltage preset by reference arc voltage setting means 10 by a differential amplifier 11 and controlling the torch 3 through a Y-motor drive controller 12 so as to always reduce the difference to zero. By virtue of this control, the arc point successively passes through the points A, B and C and thus it moves to follow the shape of the groove. At this time, the changes in the vertical movement of the torch 3 are detected as a voltage signal which varies with time by a displacement meter 13 (hereinafter referred to as a Y-axis displacement meter).

This Y-axis displacement voltage signal is applied to one input of a comparator 20 whose other input receives a preset reference voltage $e_o$ from reference voltage setting means 19 for comparison with the former. When the Y-axis displacement is equal to the reference voltage $e_o$, the comparator 20 generates an output signal so that in accordance with this output signal a changeover pulse generator 18 sends to an X-motor drive controller 15 a signal for reversing the direction of rotation of the X-axis motor 16 and the direction of the X-axis weaving is reversed. Thus, in FIG. 1 the torch 3 weaves or moves back and force across the line of travel using the points A and D at the reference voltage $e_o$ as reversing positions and thus the groove tracing control is accomplished. In FIG. 2, numeral 14 designates X-axis weaving speed setting means. Then, particularly important with the above-mentioned conventional method is the dynamic characteristic of the torch movement when the torch climbs the slope of the groove from the groove central portion, so that if this characteristic is not proper, the arc length becomes excessively short in the vicinity of the weaving terminal ends on the groove slopes or the points A and D thus causing an undercut and in extreme cases the forward end of the electrode 2 is brought into contact with the groove face. The results of studies have shown that the dynamic characteristic is affected by the gain $\beta$ of the Y-axis drive differential amplifier 11, the X-axis weaving speed $V_x$ or the weaving speed preset by the weaving speed setting means 14 and the groove angle $\Theta$ and particularly it is effective to increase the gain $\beta$ and decrease the weaving speed $v_x$ as the groove angle $\Theta$ is decreased. However, if the gain $\beta$ is increased, the Y-axis gain is excessively increased in the groove central portion (the B-C area) so that the torch responds to even a slight variation of the arc voltage and a detrimental effect is produced on the result of the welding. Also, the weaving speed $v_x$ cannot be decreased so much due to the limitation imposed by the welding heat input condition. As a result, the conventional control method including the above-mentioned dynamic characteristic is applicable only under such conditions where the groove angle is not so small and also the welding method provides a relatively stable arc.

The present invention provides an automatic groove tracing control method which expands the limitations on the application of the conventional method such as shown in FIG. 2 and which ensures greater accuracy and stable welding results, and the method is so designed that the above-mentioned required dynamic characteristic is brought into full play only on the slopes of the groove and principally it is rather aimed at the static stability of the welding in the groove central portion. The control method of the invention will now be described in greater detail with reference again to FIG. 1.

In the Figure, in the course of the tracing effected by reversing the direction of the weaving at the points of the reference voltage level $e_o$ or the points A and B, the X-axis positions at the end points A and D are stored for each weaving cycle so that small area $\delta_L$ $\delta_R$ are preliminarily defined toward the groove center from these stored positioned and these small areas are distinguished from the groove central area therebetween (hereinafter referred to as an L area). In other words, let it be assumed that the welding torch is present in the L area during one weaving cycle. The L area can be determined by subtracting the values of the small areas $\delta_L$ and $\delta_R$ from the values of the points A and D stored during the preceding weaving cycle. In this case, the values of $\delta_L$ and $\delta_R$ are preset as the minimum values required for the tracing control and these values are about 1mm in terms of X-axis displacements.

When the welding torch is present in the L area, the Y-axis gain is set to a low-gain relatively small value $\beta_1$ and the weaving speed is also set to the proper value $v_{x1}$ selected according to the welding conditions thus driving the torch. In this condition, as the torch is moved to the right in the Figure so that its X-axis position enters the small area $\delta_R$, the gain is changed to a high-gain value $\beta_2(\beta_2>\beta_1)$ and the weaving speed is changed to a low-speed value $v_{x2}(v_{x2}<v_{x1})$. Thus, the torch is allowed to move up the groove slope C–D with a fast response. While the direction of the weaving is reversed at the point of $e_o$ as in the case of the conventional method, only the weaving speed is again restored to the high speed value $v_{x1}$ so that the torch rapidly emerges from the small area $\delta_R$ after the reversing at the point of $e_o$ and the Y-axis gain is restored to the central area value of $\beta_1$ when the torch enters the L area. This operation is also performed for the torch movement to the left side (B→A) from the central portion in the Figure. Thus, the tracing accuracy is remarkably improved as compared with the conventional control method and the stable control is effected even in cases where the arc is relatively unstable, such as, the welding of a narrow groove having a small groove angle, the MIG welding and the $CO_2$ welding.

Figure 3:
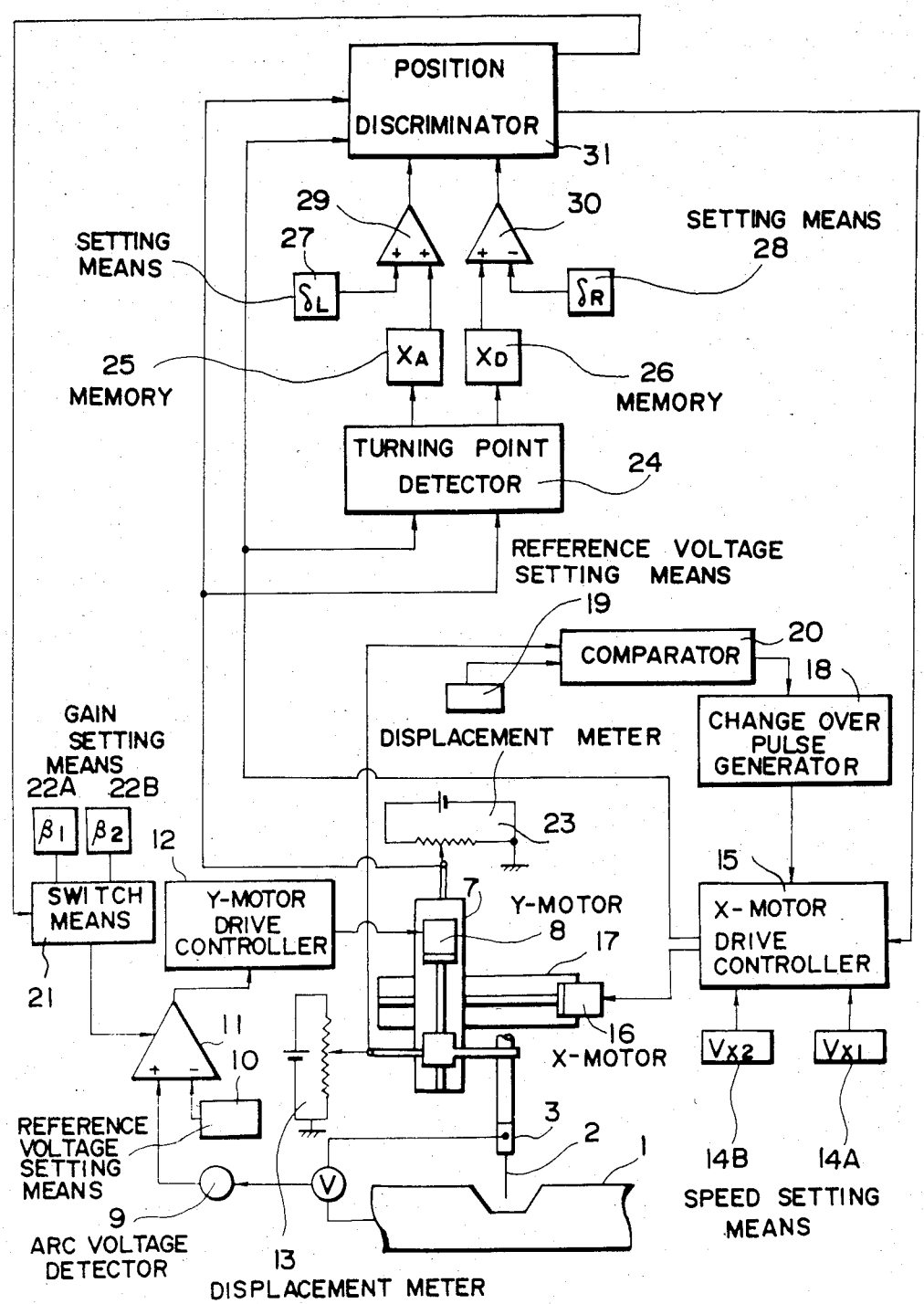
FIG. 3 is a block diagram of a control circuit used with an embodiment of the present invention.

FIG. 3 is a block diagram in which a control circuit of this invention for switching each of the Y-axis gain and the weaving speed between two values is added to the conventional circuit shown in FIG. 2. and the same cmponent parts as shown in FIG. 2 are designated by the same reference numerals. In FIG. 3, numeral 24 designates a turning point detector responsive to the inputs from an X-axis displacement meter 23 and the X-motor drive controller 15 to detect the turning points for each weaving cycle and store and update the values of $X_A$ and $X_D$ in memories 25 and 26, respectively, for each cyle of the weaving. These values are respectively operated on, along with the present values ($\delta_L$, $\delta_R$) of small area setting means 27 and 28, by an adder 29 and a subtractor 30 and the resulting values are applied to an X-axis torch position discriminator 31. The X-axis torch position discriminator 31 comprises a plurality of comparators and the present position and the direction of movement of the torch are determined according to the inputs from the X-axis displacement meter 23 and the X-motor drive controller 15 thereby discriminating the position of the torch in the X-axis direction. Switch means 21 is operated so that the Y-axis gain is changed to the high gain value $\beta_2$ preset by gain setting means 22B when the torch is in the small area $\delta_L$ or $\delta_R$ and to the normal gain value $\beta_1$ preset by gain setting means 22A when the torch is in the L area. Also, as regards the X-axis speed of the torch, the X-motor drive controller 15 is controlled such that the torch is moved at the preset value $v_{x2}$ of weaving speed setting means 14B only during the small area between the time that the torch enters the small area $\delta_L$ or $\delta_R$ from the L area and the time that the direction of the weaving is reversed and the torch is moved at the high preset value of weaving speed setting means 14A in other circumstances.

We claim:

1. In an automatic groove tracing control method for arc welding in which during arc welding of a groove of a pair of metals to be welded a welding torch is moved in its axial direction so as to maintain an arc voltage or welding current at a predetermined value and thereby maintain an arc length constant and said torch is caused to weave in a width direction of said groove with respect to a direction of welding while changing the direction of said weaving each time a displacement or position of said torch in said torch axial direction attains a predetermined value thereby effecting an automatic tracing control of said torch during said arc welding, the improvement comprising the steps of:

detecting positions of terminal ends of each cycle of said weaving from a weaving stroke of said torch in said groove width direction;

establishing a predetermined small area on each side of a central portion of said groove in accordance with said terminal ends;

increasing a first travel speed of said torch in said torch axial direction and decreasing a second travel speed of said torch in said groove width direction each time the weaving position of said torch in said groove width direction enters each of said small areas from said groove central portion;

restoring said second travel speed to its initial value when the direction of said weaving is reversed; and restoring said first travel speed of said torch to its initial value when said torch emerges from each said small area and enters said groove central portion.

2. A method according to claim 1, wherein said increase and decrease in the first travel speed of said torch are effected by switching a gain of a control system for controlling the axial movement of said torch between two values.

3. In an automatic groove tracing contol method for arc welding in which during arc welding a groove of a pair of metals to be welded a welding torch is moved in its axial direction so as to maintain an arc voltage or welding current at a predetermined value and thereby maintain an arc length constant and said torch is caused to weave in a width direction of said groove with respect to a direction of welding while changing the direction of said weaving each time a displacement or position of said torch in said torch axial direction attains a predeterined value thereby effecting an automatic tracing control of said torch during said arc welding, the improvement comprising the steps of:

detecting positions of terminal ends of each cycle of said weaving from a weaving stroke of said torch in said groove width direction;

establishing a predetermined small area on each side of a central portion of said groove in accordance with said terminal ends;

increasing a gain of a control system for controlling the movement of said torch in said torch axial direction and decreasing a travel speed of said torch in said groove width direction each time the weaving position of said torch in said groove width direction enters each of said small areas from said groove central portion;

restoring said travel speed to its initial value when the direction of said weaving is reversed; and restoring said gain to its initial value when said torch emerges from each small area and enters said groove central portion.

4. In an automatic groove tracing control method for arc welding in which during arc welding of a groove of a pair of metals to be welded a welding torch is moved in its axial direction so as to maintain an arc voltage or welding current at a predetermined value and thereby maintain an arc length constant and said torch is caused to weave in a width direction of said groove with respect to a direction of welding while changing the direction of said weaving each time a displacement or position of said torch in said torch axial direction attains a predetermined value thereby effecting an automatic tracing control of said torch during said arc welding, the improvement comprising the steps of:

detecting positions of terminal ends of each cycle of said weaving from a weaving stroke of said torch in said groove width direction;

establishing a predetermined small area on each side of a central portion of said groove in accordance with said terminal ends;

increasing a first travel speed of said torch in said torch axial direction and decreasing a second travel speed of said torch in said groove width direction each time the weaving position of said torch in said groove width direction enters each of said small areas from said groove central portion;

restoring said second travel speed to its initial value when the direction of said weaving is reversed; and restoring said first travel speed of said torch to its initial value when said torch emerges from each said small area and enters said groove central portion;

wherein said increase and decrease in the first travel speed of said torch are effected by switching a gain of a control system for controlling the axial movement of said torch between two values.

* * * * *